(12) United States Patent
Chen et al.

(10) Patent No.: US 10,873,748 B2
(45) Date of Patent: Dec. 22, 2020

(54) STORAGE OF HIGH PRECISION MOTION VECTORS IN VIDEO CODING

(71) Applicant: QUALCOMM Incorporated, San Diego, CA (US)

(72) Inventors: Yi-Wen Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/408,217

(22) Filed: May 9, 2019

(65) Prior Publication Data

US 2019/0349588 A1 Nov. 14, 2019

Related U.S. Application Data

(60) Provisional application No. 62/670,763, filed on May 12, 2018.

(51) Int. Cl.
*H04N 19/13* (2014.01)
*H04N 19/139* (2014.01)
(Continued)

(52) U.S. Cl.
CPC ......... *H04N 19/139* (2014.11); *H04N 19/176* (2014.11); *H04N 19/33* (2014.11); *H04N 19/60* (2014.11)

(58) Field of Classification Search
CPC .... H04N 19/139; H04N 19/176; H04N 19/60; H04N 19/33; H04N 19/523; H04N 19/513
See application file for complete search history.

(56) References Cited

U.S. PATENT DOCUMENTS 9,124,899 B2 * 9/2015 Misra ................... H04N 19/503
2016/0337661 A1 * 11/2016 Pang ...................... H04N 19/52
19/523
(Continued)

FOREIGN PATENT DOCUMENTS

WO 2016183216 A1 11/2016

OTHER PUBLICATIONS

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v2, 14th Meeting: Geneva, CH, Mar. 19-27, 2019, 364 pages.
(Continued)

*Primary Examiner* — Howard D Brown, Jr.
(74) *Attorney, Agent, or Firm* — Shumaker & Sieffert, P.A.

(57) ABSTRACT

A video encoder and a video decoder are configured to store and modify motion vectors to an effective range based on one or more of a motion vector precision and a motion vector bit-depth. For example, a video decoder may determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to a first effective motion vector range to produce a first clipped motion vector, and decode the first block of video data using the first clipped motion vector.

21 Claims, 5 Drawing Sheets

(51) Int. Cl.
*H04N 19/176* (2014.01)
*H04N 19/60* (2014.01)
*H04N 19/33* (2014.01)

(56) References Cited

U.S. PATENT DOCUMENTS

| | | | |
|---|---|---|---|
| 2018/0091816 A1* | 3/2018 | Chien | H04N 19/70 |
| 2018/0343448 A1* | 11/2018 | Possos | H04N 19/117 |
| 2019/0045214 A1* | 2/2019 | Ikai | H04N 19/52 |
| 2019/0246143 A1* | 8/2019 | Zhang | H04N 19/647 |
| | | | 19/647 |

OTHER PUBLICATIONS

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.

Chen Y-W., et al., "Description of SDR, HDR and 360° Video Coding Technology Proposal by Qualcomm and Technicolor"-"low and High Complexity Versions", 10. JVET Meeting, Apr. 10, 2018-Apr. 20, 2018, San Diego, (The Joint Video Exploration Team of ISO/IEC JTC1/SC29/WG11 and ITU-T SG.16 ), URL:http://phenix.int-evry.fr/jvet/no.jvet-j0021-v5, Apr. 14, 2018 (Apr. 14, 2018), XP030151183, pp. 1-43, section 3: "36°0"; p. 25-p. 26, figure 11, section 2.8.2.1.

Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/031841—ISA/EPO—dated Jul. 4, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Wang et al., "High Efficiency Video Coding (HEVC) Defect Report 3," (Joint Collaborative Team on Video Coding of ITU-T SG.16 WP 3 and ISO/IEC JTC 1/SC29/WG11); Document: JCTVC-P1003_v1, Jan. 9-17, 2014, 313 pp.

Zhou Y., et al., "Motion Vector Resolution Control for Screen Content Coding", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0277, Jan. 9, 2014 (Jan. 9, 2014), pp. 1-5, XP030115825, abstract.

* cited by examiner

STORAGE OF HIGH PRECISION MOTION VECTORS IN VIDEO CODING

This application claims the benefit of U.S. Provisional Application No. 62/670,763, filed May 12, 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for the storage and modification of motion vectors used in inter-prediction. In particular, this disclosure describes techniques for the storage, handling, and modification of motion vectors that may be signaled and/or derived at multiple different motion vector precisions (e.g., 4-pel, 1-pel, ¼-pel, ¹⁄₁₆-pel, etc.) and may be stored in one or more motion vector bit-depths (e.g., 16 bits, 18 bits, 24 bits, etc.). The techniques of this disclosure may allow a video coder (e.g., video encoder and video decoder) to maintain the high accuracy of so-called high-precision motion vectors (e.g., motion vectors signaled and/or derived at a relatively high motion vector precision) even as the effective range of possible values for components (e.g., x and y components) of motion vectors change with changing motion vector precisions and motion vector bit-depths.

In some examples, a video coder may be configured to modify and/or clip the values of components of a motion vector based on one or more of the motion vector precision of the motion vector and the motion vector bit-depth at which the components of the motion vector are to be stored in memory. That is, the motion vector precision and the motion vector bit-depth may define an effective range of codeword values that a component of a motion vector may possibly have with a given motion vector precision and/or motion vector bit-depth. In some examples, a video coder may apply processes to a motion vector that may cause the values of the components of the motion vector to go outside of such an effective range. Examples of such processes may include motion vector scaling (e.g., when using a temporal motion vector candidate or affine mode) or motion vector refinement (e.g., when performing a bilateral matching process). When a video coder determines that a component value of a modified motion vector goes outside an effective range for the motion vector, the video coder may be configured to clip the value of the component.

In one example, this disclosure describes an apparatus configured to decode video data, the apparatus comprising a memory configured to store video data, and one or more processors in communication with the memory, the one or more processors implemented in circuitry. In one example, the one or more processors are configured to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and decode the first block of video data using the first clipped motion vector.

In another example, this disclosure describes a method for decoding video data, the method comprising determining a first motion vector for a first block of video data, scaling the first motion vector to produce a scaled motion vector, determining a first effective motion vector range based on a first bit-depth of the first motion vector and a first motion vector precision of the first motion vector, clipping the scaled motion vector to the first effective motion vector range to produce a first clipped motion vector, and decoding the first block of video data using the first clipped motion vector.

In another example, this disclosure describes a non-transitory computer-readable storage medium storing instructions that, when executed, cause one or more processors configured to decode video data to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and decode the first block of video data using the first clipped motion vector.

In another example, this disclosure describes an apparatus configured to encode video data, the apparatus comprising a memory configured to store video data, and one or more processors in communication with the memory, the one or more processors implemented in circuitry. In one example, the one or more processors are configured to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and encode the first block of video data using the first clipped motion vector.

The details of one or more examples are set forth in the accompanying drawings and the description below. Other features, objects, and advantages will be apparent from the description, drawings, and claims.

DETAILED DESCRIPTION

Figure 1:
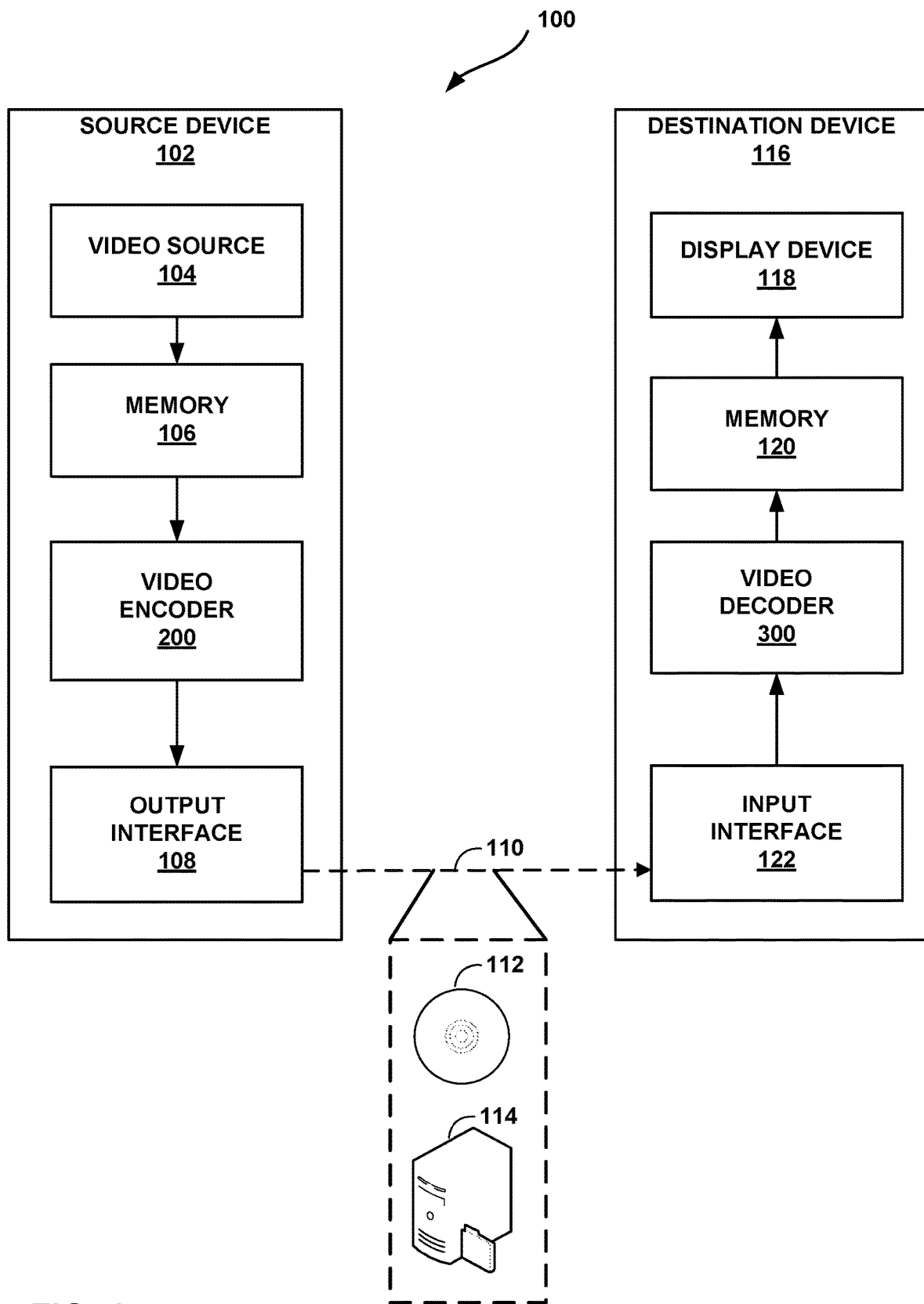
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for storing and modifying motion vectors. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for storing and modifying motion vectors. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v2 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, as will be explained in more detail below, video encoder 200 and video decoder 300 may be configured to store motion vectors at various motion vector precisions and motion vector bit-depths. In some examples, video encoder 200 and video decoder 300 may be configured to determine a motion vector bit-depth based on a motion vector precision. Video encoder 200 and video decoder 300 may also be configured to determine an effective range of codewords for the motion vector based on the motion vector precision and motion vector bit-depth. Based on this effective range, video encoder 200 and video decoder 300 may be configured to modify motion vectors when performing certain operations, such as motion vector scaling and/or motion vector refinement processes.

In one example of the disclosure, video encoder 200 and video decoder 300 may be configured to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and decode the first block of video data using the first clipped motion vector.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
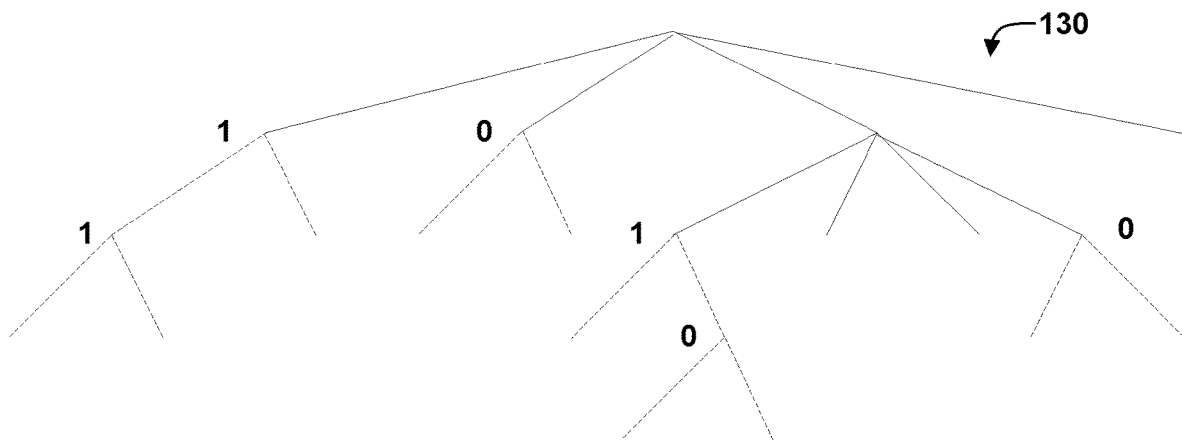
FIGS. 2A and 2B are conceptual diagrams illustrating an example quadtree binary tree (QTBT) structure, and a corresponding coding tree unit (CTU).
Figure 2B:
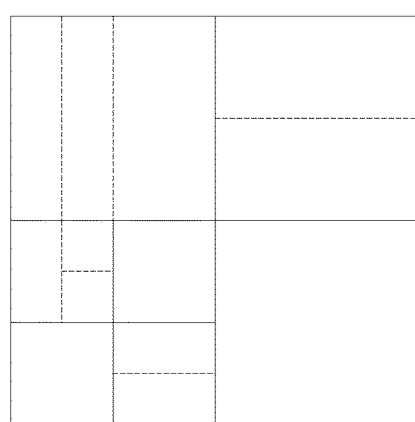

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
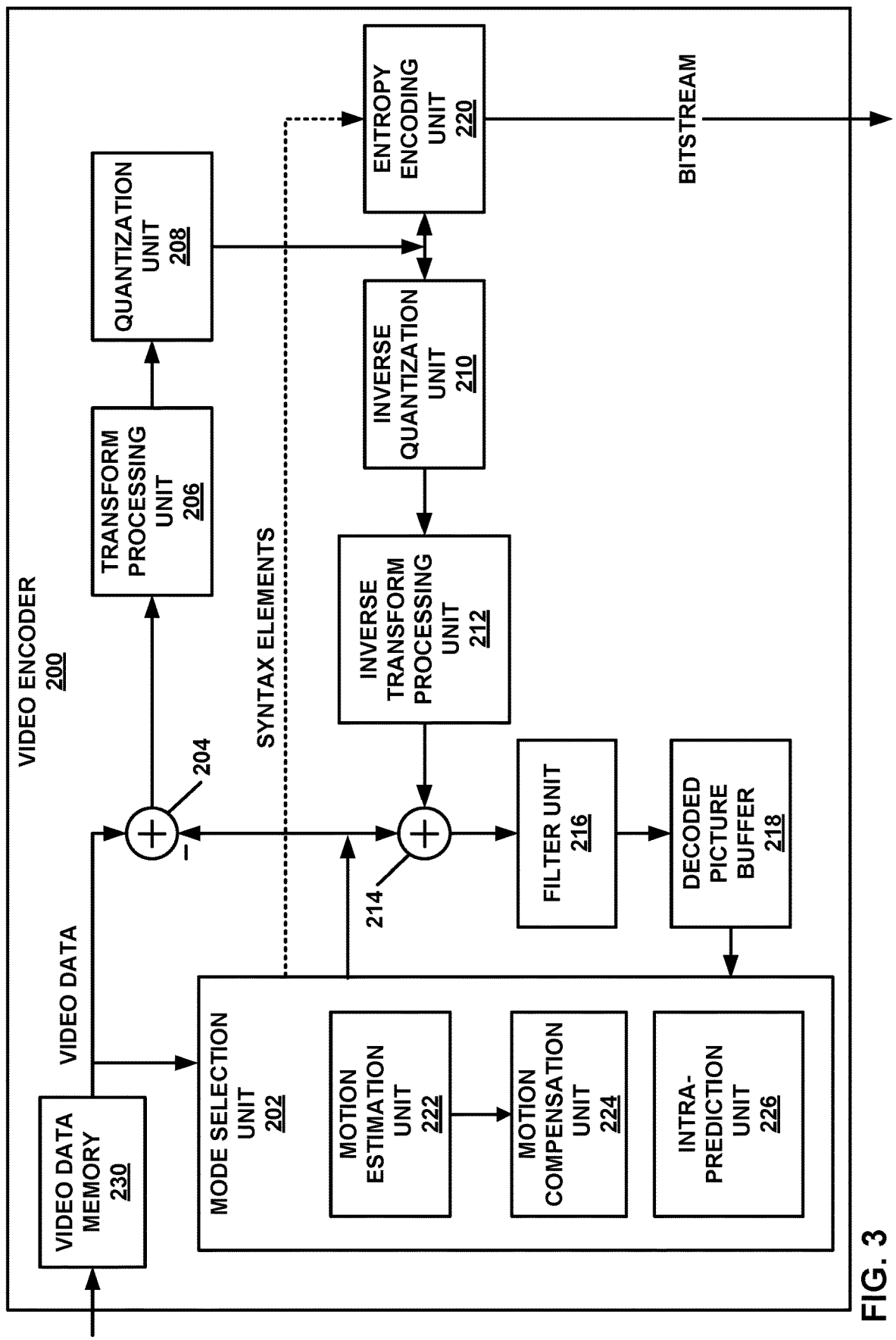
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In one example of the disclosure, motion estimation unit 222, motion compensation unit 224, or another structure of video encoder 200 may be configured to perform the techniques of this disclosure for the storage and modification of motion vectors. In one example of the disclosure, motion estimation unit 222 may be configured to determine a first motion vector for a first block of video data. In some examples, e.g., when performing inter-prediction using affine mode motion compensation or when using a temporal motion vector predictor, motion compensation unit 224 may be configured to scale the first motion vector to produce a scaled motion vector. In accordance with the techniques of this disclosure that will be described in more detail below, motion compensation unit 224 may be further configured to clip the scaled motion vector to a first effective motion vector range to produce a first clipped motion vector, wherein the first effective motion vector range is based on a first bit-depth of the first motion vector and a first motion vector precision of the first motion vector. Motion compensation unit 224 may further be configured to encode the first block of video data using the first clipped motion vector.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and encode the first block of video data using the first clipped motion vector.

Figure 4:
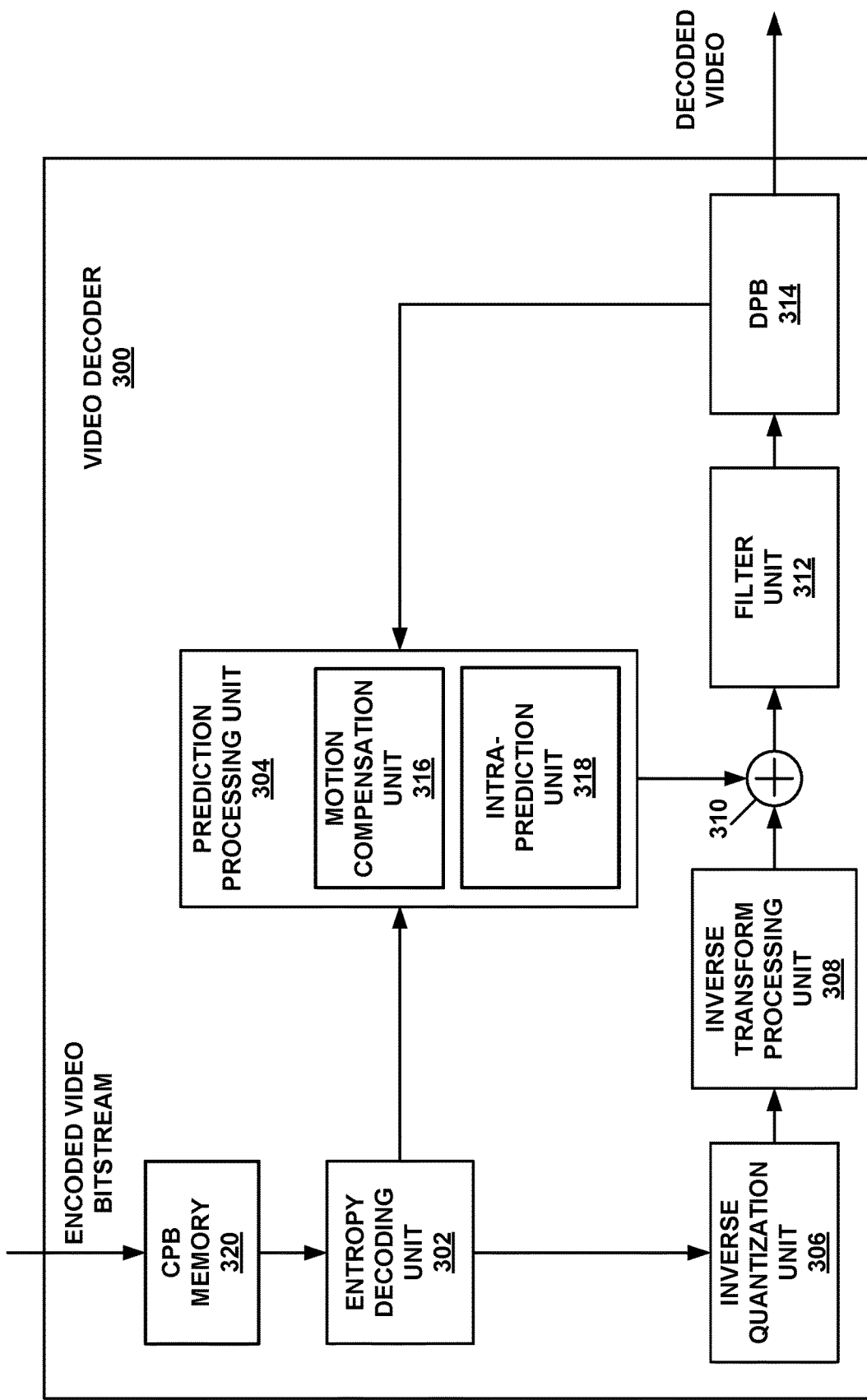
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAIVI), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In one example of the disclosure, motion compensation unit 316 or another structure of video decoder 300 may be configured to perform the techniques of this disclosure for the storage and modification of motion vectors. In one example, of the disclosure, motion compensation unit 316 may be configured to determine a first motion vector for a first block of video data. In some examples, e.g., when performing inter-prediction using affine mode motion compensation or when using a temporal motion vector predictor, motion compensation unit 316 may be configured to scale the first motion vector to produce a scaled motion vector. In accordance with the techniques of this disclosure that will be described in more detail below, motion compensation unit 316 may be further configured to clip the scaled motion vector to a first effective motion vector range to produce a first clipped motion vector, wherein the first effective motion vector range is based on a first bit-depth of the first motion vector and a first motion vector precision of the first motion vector. Motion compensation unit 316 may further be configured to decode the first block of video data using the first clipped motion vector.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine a first motion vector for a first block of video data, scale the first motion vector to produce a scaled motion vector, determine a first effective motion vector range based on a first bit-depth of the first motion vector and a first motion vector precision of the first motion vector, clip the scaled motion vector to the first effective motion vector range to produce a first clipped motion vector, and decode the first block of video data using the first clipped motion vector.

As described above, some modern video codecs, such as HEVC, generally use several inter prediction modes, such as AMVP, skip, and merge modes. Video coders configured to operate according to HEVC derive and/or signal motion vectors for such inter prediction modes in ¼-pel precision. Video codecs other than HEVC, such as VVC, may also use multiple inter prediction modes. However, not all the inter prediction modes operate on ¼-pel precision or using just one particular motion vector precision. One example is inter prediction modes that use adaptive motion resolution, which may use and signal motion vectors with a plurality of different precisions. For example, motion vector precisions any combination of ¼-pel, ⅛-pel, 1-pel, or even 4-pel. Typically, high precision motion vectors provide for more accurate motion representation. The more accurate motion representation then typically results in lower prediction error.

In other examples, a video codec may be configured to signal and/or derive a motion vector (and/or motion vector difference) in one motion vector precision, such as ¼-pel. In the same video codec, other inter prediction modes that only derive motion vectors from the coded information (e.g., without signaling the motion vector in the coded video bitstream), may use another precision, such as ¹⁄₁₆-pel. This enables higher motion vector precision without signaling cost. In addition, or alternatively, there may be some inter prediction modes in which the video coder signals representative motion vectors in one precision and then utilizes the representative motion vectors to derive motion vectors in other precision, such as in one example of affine mode in JEM.

As can be seen from the various inter prediction modes and motion vector precision examples described above, motion vector storage techniques may need to handle different motion vector precisions. Some examples of motion vector storage techniques include:
1. Store all motion vectors in one precision. Motion vectors with higher precision than the storage precision may be rounded or truncated. Motion vectors with higher precision than the storage precision may be scaled.
2. Store motion vectors in several precisions. Each motion vector is stored with a flag to indicate the precision.
3. Store motion vectors of one block in one precision. Each block has a flag to indicate the precision. Two or more precisions are used for multiple blocks.

In some example, each motion vector has a fixed size of storage in memory. For example, in HEVC, each component of a motion vector (e.g., x-direction component and y-direction component) is stored using 16 bits. That limitation implies that the value of a component of the motion vector cannot go beyond the range of [−8192 to 8191+¾] (e.g., when using ¼-pel precision). With different motion vector precisions, the effective range of the motion vector can change from precision to precision. For example, consider 16 bits storage for each component of a motion vector. If the motion precision changes to ¹⁄₁₆-pel, the effective range is then changed to [−2048, 2047+¹⁵⁄₁₆] compared to ¼-pel precision.

In view of this feature of using multiple motion vector precisions, this disclosure describes techniques for determining progressive (or adaptive) motion vector ranges. Examples of this disclosure include systems and methods in video codecs (e.g., video encoder 200 and video decoder 300 implementing such codecs) to store the motion vectors when multiple motion vector precisions co-exist in the codec.

In general, this disclosure describes techniques for the storage and modification of motion vectors used in inter-prediction. In particular, this disclosure describes techniques for the storage, handling, and modification of motion vectors that may be signaled and/or derived at multiple different motion vector precisions (e.g., 4-pel, 1-pel, ¼-pel, ¹⁄₁₆-pel, etc.) and may be stored in one or more motion vector bit-depths (e.g., 16 bits, 18 bits, 24 bits, etc.). The techniques of this disclosure may allow a video coder (e.g., video encoder 200 and video decoder 300) to maintain the high accuracy of so-called high-precision motion vectors (e.g., motion vectors signaled and/or derived at a relative high motion vector precision) even as the effective range of possible values for components (e.g., x and y components) of a motion vector change with changing motion vector precisions and motion vector bit-depths.

In some examples, video encoder 200 and video decoder 300 may be configured to modify and/or clip the values of components of a motion vector based on one or more of the motion vector precision of the motion vector and the motion vector bit-depth at which the components of the motion vector are to be stored in memory. That is, the motion vector precision and the motion vector bit-depth may define an effective range of codeword values that a component of a motion vector may possibly have with a given motion vector precision and/or motion vector bit-depth. In some examples, video encoder 200 and video decoder 300 may apply processes to a motion vector that may cause the values of the components of the motion vector to go outside of such an effective range. Examples of such processes may include motion vector scaling (e.g., when using a temporal motion vector candidate or affine mode) or motion vector refinement (e.g., when performing a bilateral matching process). When video encoder 200 and/or video decoder 300 determines that a component value of a modified motion vector goes outside an effective range for the motion vector, video encoder 200 and/or video decoder 300 may be configured to clip the value of the component.

To illustrate some examples, the following discussion illustrates using two different motion vector precisions: the ¼-pel motion vector precision (or so-called low-precision motion vector in our example) and ¹⁄₁₆-pel motion vector precision (or so-called high-precision MV in our example). However, the techniques of this disclosure are not limited to these two motion vector precisions, but rather the techniques of this disclosure can be applied to any number of motion vector precisions. That is, the techniques of this disclosure are not limited to specifically a single low and high motion vector precision, such as ¼ and ¹⁄₁₆. These precisions are noted in the examples below merely by way of example.

Further, it is noted that various examples below are discussed with respect to using 16-bits to store motion vector components. However, the techniques of this disclosure may be used with other motion vector bit-depths, including 18, 24, 32, or any other suitable number of bits to store motion vector components.

Example Motion Vector Storage Techniques 1

In one example of the disclosure, video encoder 200 and video decoder 300 (e.g., motion estimation unit and motion compensation unit 316) may be configured to determine the motion vector bit-depth to store motion vectors based on a specified motion vector precision. A motion vector precision may be specified by syntax elements signaled in a coded video bitstream and/or the motion vector precision may be determined by video decoder 300 implicitly from video coding characteristics.

In one example, the specified motion vector precision is the high-precision motion vector precision (e.g., ¹⁄₁₆-pel MV precision) and has a related effective motion vector range. In this example, the motion vector bit-depth may be a fixed number (e.g., 18 bits), but the motion vector precision may change frame to frame or region to region based on signaled parameters (e.g., parameters encoded by video encoder 200 and/or parameters decoded by video decoder 300) defined by syntax elements in one or more parameter sets. For example, if one example is to provide the effective range of a motion vector (e.g., an x or y component of the motion vector) being in the range [−8192.00, 8191.75] integer pixels, video encoder 200 and video decoder 300 may be configured to use 18 bits to store each component of the high-precision motion vectors.

Meanwhile, the same motion vector bit-depth (e.g., 18 bits) is also used to store each component of any low-precision motion vectors. Under this scheme, any motion vector derivation or signaling for a block of video data would be subject to the range restriction. If the motion vector is out of the range, video encoder 200 and video decoder 300 may be configured to perform further modifications on the motion vector before the motion vector is stored or even before the motion vector is used for other modules (e.g., motion compensation or derivation of other motion information). Some modifications for further examples are illustrated below. These further modifications may be used alone or in suitable combination with other examples herein.

In some examples, video encoder 200 and video decoder 300 may perform a scaling process on a motion vector (e.g., motion vector scaling). For example, video encoder 200 and video decoder 300 may perform motion vector scaling based on the picture order count (POC) value of a temporal reference picture when performing temporal motion vector prediction (e.g., temporal motion vector perdition in HEVC). When performing motion vector scaling, video encoder 200 and video decoder 300 may be configured to modify (e.g., clip) the scaled motion vectors to fall within the effective motion vector range. Video encoder 200 and video decoder 300 may be configured to determine the effective (e.g., clipped) range as $[-2^{(N-P-1)}, 2^{(N-P-1)}-(1\frac{1}{2}^{(P)})]$, where N is the motion vector bit-depth, and motion vector P is the bits used to represent the motion vector precision (e.g., P=4 for $\frac{1}{16}$-pel MV precision).

In one example of the disclosure, video encoder 200 and video decoder 300 may be configured to determine a first motion vector for a first block of video data. In this example, video encoder 200 and video decoder 300 may be configured to encode or decode the first block of video data using the first motion and an inter-prediction mode. The inter-prediction mode may be one of skip mode, merge mode, AMVP mode, affine mode, or any other inter-prediction mode that uses a motion vector.

In some examples, video encoder 200 and video decoder 300 may be configured to scale the first motion vector to produce a scaled motion vector. In some examples, scaling may be used for temporal motion vector candidates and/or for affine motion vectors. In accordance with the techniques of this disclosure, video encoder 200 and video decoder 300 may be configured to clip the scaled motion vector to a first effective motion vector range to produce a first clipped motion vector, wherein the first effective motion vector range is based on a first bit-depth of the first motion vector and a first motion vector precision of the first motion vector. In one example, the first effective motion vector range is defined as $[-2^{(N-P-1)}, 2^{(N-P-1)}-(1\frac{1}{2}^{(P)})]$, where N is the first bit-depth of the first motion vector, and P represents the first motion vector precision of the first motion vector. Video encoder 200 and video decoder 300 may be configured to then encode or decode the first block of video data using the first clipped motion vector.

In another example of the disclosure, video encoder 200 and video decoder 300 may be configured to determine the first motion vector precision of the first motion vector, and determine the first bit-depth of the first motion vector based on the first motion vector precision. In one example, the first bit-depth of the first motion vector is 18 bits, and the first motion vector precision of the first motion vector is $\frac{1}{16}$-pel motion vector precision. Video encoder 200 and video decoder 300 may then be configured to store the first motion vector in a memory (e.g., video data memory 230, decoded picture buffer 218, CPB memory 320, DPB 314, or any other memory available to video encoder 200 or video decoder 300) at the determined first bit-depth.

When performing motion vector scaling (e.g., the scaling used for temporal motion vector prediction in HEVC), the scaled motion vectors may be invalid if the scaled motion vector does not fall within the effective motion vector range. As described above, video encoder 200 and video decoder 300 may be configured to determine the effective motion vector range as $[-2^{(N-P-1)}, 2^{(N-P-1)}-(1\frac{1}{2}^{(P)})]$, where N is the motion vector bit-depth, and P is the bits to represent the fractional motion vectors (e.g., P=4 for $\frac{1}{16}$-pel motion vector precision). Invalid scaling may result in unavailable motion vector prediction or merge candidates. In another example, invalid scaling may result in no motion vector scaling, so motion vectors before and after scaling are the same (i.e., scaling factor equals to 1).

In another example of the disclosure, when performing motion vector refinement (e.g., motion vector refinement used in bilateral matching mode, such as in JEM), video encoder 200 and video decoder 300 may be configured to modify (e.g., clip) the refined motion vector to fall within the effective motion vector range. Video encoder 200 and video decoder 300 may be configured to determine the effective range as $[-2^{(N-P-1)}, 2^{(N-P-1)}-(1\frac{1}{2}^{(P)})]$, where N is the motion vector bit-depth, and P is the bits to represent the motion vector precision (e.g., P=4 for $\frac{1}{16}$-pel MV precision).

In another example of the disclosure, when performing motion vector refinement (e.g., bilateral matching, such as in JEM), video encoder 200 and video decoder 300 may be configured to revert the refined motion vectors to a non-refined motion vector (e.g., the motion vector before the refinement process) if the refined motion vector does not fall within the effective motion vector range. As described above, video encoder 200 and video decoder 300 may be configured to determine the effective motion vector range as $[-2^{(N-P-1)}, 2^{(N-P-1)}-(1\frac{1}{2}^{(P)})]$, where N is the motion vector bit-depth, and P is the bits to represent the fractional motion vectors (e.g., P=4 for $\frac{1}{16}$-pel motion vector precision).

In another example of the disclosure, when performing motion vector refinement (e.g., Bilateral Matching in JEM), video encoder 200 and video decoder 300 may be configured to not allow the refinement process to cause a value of a component of a motion vector to go out of the effective range. The effective range could be determined as $[-2^{(N-P-1)}, 2^{(N-P-1)}-(1\frac{1}{2}^{(P)})]$, where N is the bit-depth, and P is the bits to represent the motion vector precision (e.g. P=4 for $\frac{1}{16}$-pel MV precision).

Figure 5:
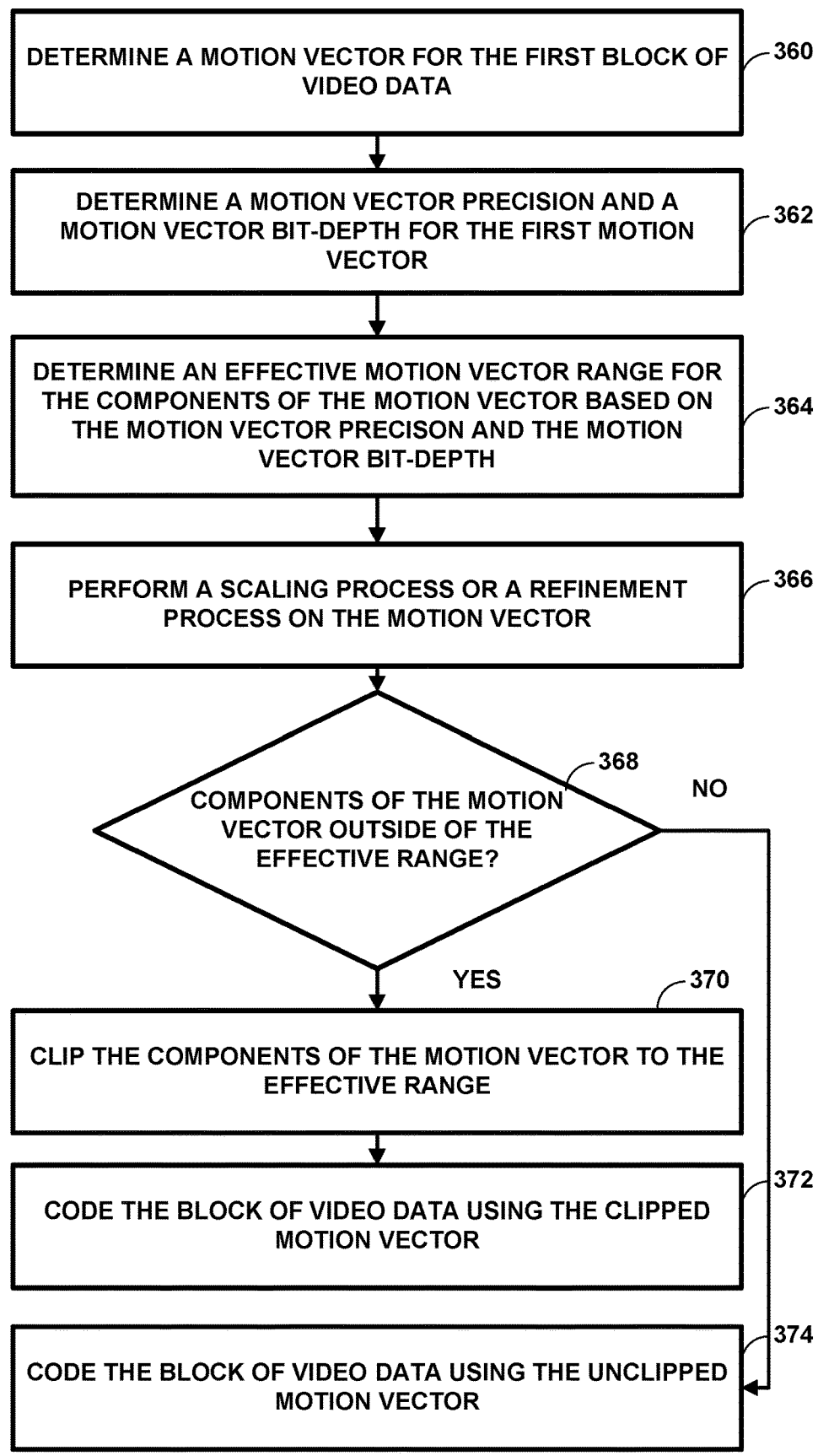
FIG. 5 is a flowchart illustrating and example coding method of the disclosure.

FIG. 5 is a flowchart illustrating an example coding method of the disclosure. The techniques of FIG. 5 may be performed by one or more structural components of video encoder 200 and/or video decoder 300, including motion estimation unit 222 and motion compensation unit 224 of video encoder 200, and motion compensation unit 316.

In one example of the disclosure, video encoder 200 and video decoder 300 may be configured to determine a motion vector for a first block of video data (360). The motion vector may be any type of motion vector used to code a block of video data, including motion vectors for merge mode, AMVP mode, affine motion compensation mode, or other motion vectors for decoder-side motion vector derivation techniques (e.g., bilateral matching). Video encoder 200 and video decoder may be further configured to determine a motion vector precision and a motion vector bit-depth for the motion vector (362), and then determine an effective motion vector range for the components of the motion vector (e.g., the x and y components) based on the motion vector precision and the motion vector bit-depth (364). In one example, the bit-depth of the motion vector is 18 bits, and the motion vector precision of the motion vector is 1/16-pel motion vector precision.

In some examples, video encoder 200 and video decoder 300 may be configured to perform a scaling or refinement process on the motion vector (366). For example, video encoder 200 and video decoder 300 may be configured to perform a scaling process on the motion vector when the motion vector is a temporal motion vector candidate. In other examples, video encoder 200 and video decoder 300 may be configured to perform a scaling process on the motion vector when performing prediction according to an affine mode. In other examples, video encoder 200 and video decoder 300 may be configured to perform a refinement process on the motion vector when performing bilateral matching.

After the scaling or the refinement process, video encoder 200 and video decoder 300 may be configured to determine if the components of the motion vector are outside the effective range (368). In one example, the effective motion vector range is defined as $[-2^{(N-P-1)}, 2^{(N-P-1)}-(1\frac{1}{2}^{(P)})]$, where N is the bit-depth of the motion vector, and P represents the motion vector precision of the motion vector. If the components of the motion vector are not outside the effective range, video encoder 200 and video decoder 300 may be configured to code (e.g., encode or decode) the block of video data using an unclipped motion vector (e.g., a motion vector with no further modifications after the scaling or refinement) (374).

If the components of the motion vector are outside the effective range, video encoder 200 and video decoder 300 may be configured to clip the components of the motion vector to the effective range (370). Video encoder 200 and video decoder 300 may be configured to then code (i.e., encode or decode, respectively) the block of video data using the clipped motion vector (372).

Example Motion Vector Storage Techniques 2

In another example of the disclosure, video encoder 200 and video decoder 300 may be configured to encode/decode a syntax element (e.g., a flag) for each motion vector to indicate if the motion vector is in low-precision (e.g., 1/4-pel) or is in high-precision (e.g., 1/16-pel). In some examples, video encoder 200 and video decoder 300 may be configured to encode/decode a multi-bit syntax element whose values can indicate three or more motion vector precisions. When a fixed-length number of bits are used to store the motion vector, the effective motion vector ranges are different for the different motion vector precisions. For example, when 16-bits are used to store each component of a motion vector, the effective range of a motion vector is in [−8192.00, 8191.75] integer pixels when the motion vector precision is 1/4-pel. In high precision (stored in 1/16-pel precision), the effective range of a motion vector is [−2048.00, 2047.09375] integer pixels.

Under this scheme, any motion vector derivation or signaling for a block of video data would be subject to a range restriction. If the motion vector is out of the range, video encoder 200 and video decoder 300 may be configured to perform further modifications on the motion vector before the motion vector is stored or even before the motion vector is used for other coding processes (e.g., motion compensation or derivation of other motion information). In other examples, video encoder 200 and video decoder 300 may be configured to abandon out of the range motion vectors for future usage.

Some further example modifications are illustrated below. When performing motion vector scaling (e.g., the scaling used for temporal MV prediction in HEVC), video encoder 200 and video decoder 300 may be configured to modify (e.g., clip) the scaled motion vectors to fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the fractional motion vectors (e.g., P=2 for 1/4-pel motion vector precision and P=4 for 1/16-pel motion vector precision).

In another example, when performing motion vector scaling (e.g., the scaling used for temporal MV prediction in HEVC), video encoder 200 and video decoder 300 may be configured to change the scaled motion vector's precision to fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the fractional motion vectors (e.g., P=2 for 1/4-pel motion vector precision and P=4 for 1/16-pel motion vector precision).

In another example, when performing motion vector scaling (e.g., the scaling used for temporal motion vector prediction in HEVC), video encoder 200 and video decoder 300 may be configured to mark the scaled motion vector as invalid if the scaled motion vector does not fall within the effective motion vector range. When marked as invalid, video encoder 200 and video decoder 300 may be configured to not use such a motion vector. Again, the effective range could be determined as $[-2^{(N-P-1)}, 2^{(N-P-1)}-(1\frac{1}{2}^{(P)})]$, where N is the bit-depth, and P is the bits used to represent the fractional motion vectors (e.g., P=2 for 1/4-pel motion vector precision and P=4 for 1/16-pel motion vector precision). Invalid scaling may result in unavailable motion vector predictor or merge candidates. In another example, invalid scaling may result in no motion vector scaling, so motion vectors before and after scaling are the same (i.e., scaling factor equals to 1).

In this example, when performing motion vector refinement (e.g., Bilateral Matching in JEM), video encoder 200 and video decoder 300 may be configured to modify (e.g., clip) the refined motion vectors fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for 1/4-pel motion vector precision and P=4 for 1/16-pel motion precision).

When performing motion vector refinement (e.g., Bilateral Matching in JEM), video encoder 200 and video decoder 300 may be configured to revert the refined motion vectors to non-refined motion vectors (e.g., the values of the motion vector components before refinement). The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for 1/4-pel motion vector precision and P=4 for 1/16-pel motion precision).

During the motion vector refinement (e.g., Bilateral Matching in JEM), video encoder 200 and video decoder 300 may be configured to limit the search process, such that the search process does not go out of the effective range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for 1/4-pel motion vector precision and P=4 for 1/16-pel motion precision).

When deriving a synthetic motion vector from two or more motion vectors, such as weighted averaging multiple motion vectors, there may be more than one motion precision. In this example, video encoder 200 and video decoder 300 may be configured to choose one motion vector precision as the motion vector precision to perform the motion vector syntheses. In some examples, video encoder 200 and video decoder 300 may be configured to scale all the source motion vector predictors to the chosen motion vector precision and the synthesized motion vector may be modified (e.g., clipped) to be within the effective motion vector range of the chosen motion vector precision.

In other examples, video encoder 200 and video decoder 300 may be configured to choose one motion vector precision as the motion vector precision to perform the motion vector syntheses. Video encoder 200 and video decoder 300 may be configured to scale all the source motion vector predictors to the chosen motion vector precision. When the synthesized motion vector is outside the effective motion vector range of the chosen motion vector precision, video encoder 200 and video decoder 300 may be configured to mark the synthetic motion vector predictor as not valid and not use the synthetic motion vector predictor in any motion vector prediction processes.

Example Motion Vector Storage Techniques 3

In another example, video encoder 200 and video decoder 300 may be configured to encode and decode a syntax element, such as a flag, for each block (the block could be a coding unit, prediction unit or any kind of unit to code one block of pixels) to indicate if the motion vector for the block is in low-precision (e.g., ¼-pel) or is in high-precision (e.g., ¹⁄₁₆-pel). When fixed-length bits are used to store the motion vector, the effective motion vector ranges are different using different motion vector precisions. For example, when 16-bits are used to store each component of a motion vector, the effective range of a motion vector is in [−8192.00, 8191.75] integer pixels when the motion vector precision is ¼-pel. In high precision (e.g., stored in ¹⁄₁₆-pel precision), the effective range of a motion vector is [−2048.00, 2047.09375] integer pixels.

Under this scheme, any motion vector derivation or signaling of a block would be subject to the range restriction. If the motion vector is out of the range, video encoder 200 and video decoder 300 may be configured to perform further modifications on the motion vector before the motion vector is stored or even before being used for other video coding processes (e.g., motion compensation, or derivation of other motion information). In other examples, video encoder 200 and video decoder 300 may be configured to not use out of the range motion vectors for future video coding processes. Other possible modifications are illustrated below.

When performing motion vector scaling (e.g., the scaling used for temporal motion vector prediction in a codec performing that operation similar to HEVC), video encoder 200 and video decoder 300 may be configured to modify (e.g., clip) the scaled motion vectors to fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion precision).

In another example, when performing motion vector scaling (e.g., the scaling used for temporal motion vector prediction in a codec performing that operation similar to HEVC), video encoder 200 and video decoder 300 may be configured to change the precision of the scaled motion vectors to fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion vector precision).

In another example, when performing motion vector scaling (e.g., the scaling used for temporal motion vector prediction in a codec performing that operation similar to HEVC), video encoder 200 and video decoder 300 may be configured to mark the scaled motion vectors as invalid if the scaled motion vector does not fall within the effective motion vector range. Video encoder 200 and video decoder 300 may be configured to not use motion vectors marked as invalid. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion vector precision). Invalid scaling may result in an unavailable motion vector predictor or merge candidate. In another example, invalid scaling may result in no motion vector scaling, so motion vectors before and after scaling are the same (i.e., scaling factor equals to 1).

When performing motion vector refinement (e.g., Bilateral Matching such as in JEM), video encoder 200 and video decoder 300 may be configured to modify (e.g., clip) the refined motion vectors to fall within the effective motion vector range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion precision).

In another example, when performing motion vector refinement (e.g., Bilateral Matching such as in JEM), video encoder 200 and video decoder 300 may be configured to revert the refined motion vectors to non-refined motion vector (e.g., the values of the components of the motion vector before refinement). The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion precision).

In another example, during the motion vector refinement (e.g., Bilateral Matching such as in JEM), video encoder 200 and video decoder 300 may be configured to perform the search process such that the search process cannot go out of the effective range. The effective range could be determined as $[-2^{(N-P-1)}, 2^{(N-P-1)}-(1\frac{1}{2}^{(P)})]$, where N is the bit-depth, and P is the bits used to represent the mv precision (e.g., P=2 for ¼-pel motion vector precision and P=4 for ¹⁄₁₆-pel motion precision).

In another example, when deriving a synthetic motion vector from two or more motion vectors, such as a weighted average of multiple motion vectors and/or the combined bi-prediction candidates of HEVC, the motion vectors may have more than one motion vector precision. In this example, video encoder 200 and video decoder 300 may be configured to choose one motion vector precision as the motion vector precision to perform the motion vector syntheses. All the source motion vector predictors may be scaled to the chosen motion vector precision and the synthesized motion vector may be modified (e.g., clipped) to be within the effective motion vector range of the chosen motion vector precision.

In another example, video encoder 200 and video decoder 300 may be configured to choose one motion vector precision as the motion vector precision to perform the motion vector syntheses. All the source motion vector predictors may be scaled to chosen motion vector precision. When the synthesized motion vector is outside the effective motion vector range of the chosen motion vector precision, the synthetic motion vector predictor is regarded as not valid Further Examples On top of all the previously-described techniques, examples may include different bit-depths to store the x-component and the y-component of a motion vector. Video encoder 200 may signal the bit-depths to video decoder 300 in one or more parameter sets in the encoded video bitstream. For example, when a fixed-length (e.g., 16 bits) is used to store the motion vectors, the x-component and y-component both use 16-bits to store the motion vector components. In one example, x-component may use N bits borrowed from the bits from y-components to store the motion vectors. For example, if N=2, video encoder 200 and video decoder 300 may be configured to use 18 bits to store x-components and use 14-bits to store y-components. The valid motion vector range for x-components and y-components are also different according to the selected number N.

Certain examples above are described with respect to inter-prediction tools, or modified inter-prediction tools, from existing codecs such as HEVC or JEM. One of skill in the art will recognize that such examples define a new codec using such modified inter-prediction tools according to the examples herein but as otherwise described and known in the art.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface.

The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Various examples have been described. These and other examples are within the scope of the following claims.

What is claimed is:

1. An apparatus configured to decode video data, the apparatus comprising:
   a memory configured to store video data; and
   one or more processors in communication with the memory, the one or more processors implemented in circuitry, the one or more processors configured to:
   determine a motion vector for a block of video data;
   perform a motion vector refinement process for the motion vector to produce a refined motion vector;
   determine an effective motion vector range based on a bit-depth of the motion vector and a motion vector precision of the motion vector;

clip the refined motion vector to the effective motion vector range to produce a clipped motion vector; and
decode the block of video data using the clipped motion vector.

2. The apparatus of claim 1, wherein to determine the effective motion vector range, the one or more processors are further configured to determine the effective motion vector range as $[-2^{(N-P-1)}, 2^{(N-P-1)}-(1-1/2^{(P)})]$, where N is the bit-depth of the motion vector, and P represents the motion vector precision of the motion vector.

3. The apparatus of claim 1, wherein the one or more processors are further configured to:
determine the motion vector precision of the motion vector;
determine the bit-depth of the motion vector based on the motion vector precision; and
store the motion vector in the memory at the determined bit-depth.

4. The apparatus of claim 1, wherein the bit-depth of the motion vector is 18 bits, and wherein the motion vector precision of the motion vector is 1/16-pel motion vector precision.

5. The apparatus of claim 1, wherein to decode the block of video data using the clipped motion vector, the one or more processors are configured to:
decode the block of video data using the clipped motion vector and a bilateral matching mode.

6. The apparatus of claim 1, further comprising:
a display configured to display the decoded block of video data for display.

7. A method for decoding video data, the method comprising:
determining a motion vector for a block of video data;
performing a motion vector refinement process for the motion vector to produce a refined motion vector;
determining an effective motion vector range based on a bit-depth of the motion vector and a motion vector precision of the motion vector;
clipping the refined motion vector to the effective motion vector range to produce a clipped motion; and
decoding the block of video data using the clipped motion vector.

8. The method of claim 7, wherein determining the effective motion vector range comprises determining the effective motion vector range as $[-2^{(N-P-1)}, 2^{(N-P-1)}-(1\frac{1}{2}^{(P)})]$, where N is the bit-depth of the motion vector, and P represents the motion vector precision of the motion vector.

9. The method of claim 7, the method further comprising:
determining the motion vector precision of the motion vector;
determining the bit-depth of the motion vector based on the motion vector precision; and
storing the motion vector in the memory at the determined bit-depth.

10. The method of claim 7, wherein the bit-depth of the motion vector is 18 bits, and wherein the motion vector precision of the motion vector is 1/16-pel motion vector precision.

11. The method of claim 7, wherein decoding the block of video data using the clipped motion vector comprises:
decoding the block of video data using the clipped motion vector and a bilateral matching mode.

12. The method of claim 7, the method further comprising:
displaying the decoded block of video data for display.

13. A non-transitory computer-readable storage medium storing instructions that, when executed, cause one or more processors configured to decode video data to:
determine a motion vector for a block of video data;
perform a motion vector refinement process for the motion vector to produce a refined motion vector;
determine an effective motion vector range based on a bit-depth of the motion vector and a motion vector precision of the motion vector;
clip the refined motion vector to the effective motion vector range to produce a clipped motion vector; and
decode the block of video data using the clipped motion vector.

14. The non-transitory computer-readable storage medium of claim 13, wherein to determine the effective motion vector range, the instructions further cause the one or more processors to determine the effective motion vector range as $[-2^{(N-P-1)}, 2^{(N-P-1)}-(1\frac{1}{2}^{(P)})]$, where N is the bit-depth of the motion vector, and P represents the motion vector precision of the motion vector.

15. The non-transitory computer-readable storage medium of claim 13, wherein to decode the block of video data using the clipped motion vector, the instructions further cause the one or more processors to:
decode the block of video data using the clipped motion vector and a bilateral matching mode.

16. An apparatus configured to encode video data, the apparatus comprising:
a memory configured to store video data; and
one or more processors in communication with the memory, the one or more processors implemented in circuitry, the one or more processors configured to:
determine a motion vector for a block of video data;
perform a motion vector refinement process for the motion vector to produce a refined motion vector;
determine an effective motion vector range based on a bit-depth of the motion vector and a motion vector precision of the motion vector;
clip the refined motion vector to the effective motion vector range to produce a clipped motion vector; and
encode the block of video data using the clipped motion vector.

17. The apparatus of claim 16, wherein to determine the effective motion vector range, the one or more processors are further configured to determine the effective motion vector range as $[-2^{(N-P-1)}, 2^{(N-P-1)}-(1\frac{1}{2}^{(P)})]$, where N is the bit-depth of the motion vector, and P represents the motion vector precision of the motion vector.

18. The apparatus of claim 16, wherein the one or more processors are further configured to:
determine the motion vector precision of the motion vector;
determine the bit-depth of the motion vector based on the motion vector precision; and
store the motion vector in the memory at the determined bit-depth.

19. The apparatus of claim 16, wherein the bit-depth of the motion vector is 18 bits, and wherein the motion vector precision of the motion vector is 1/16-pel motion vector precision.

20. The apparatus of claim 16, wherein to encode the block of video data using the clipped motion vector, the one or more processors are configured to:
encode the block of video data using the clipped motion vector and a bilateral matching mode.

21. The apparatus of claim 16, further comprising:
a camera configured to capture the first block of video data.

\* \* \* \* \*